US008607401B2

(12) United States Patent
Hozumi et al.

(10) Patent No.: US 8,607,401 B2
(45) Date of Patent: Dec. 17, 2013

(54) CLEANING APPARATUS

(75) Inventors: Hisashi Hozumi, Tokyo (JP); Mitsuaki Shimamura, Saitama (JP); Yutaka Togasawa, Yokohama (JP); Naruhiko Mukai, Yokohama (JP); Shinji Toki, Yokohama (JP); Yasuhiro Yuguchi, Yokohama (JP); Koichi Soma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 504 days.

(21) Appl. No.: 12/707,120

(22) Filed: Feb. 17, 2010

(65) Prior Publication Data

US 2010/0205770 A1 Aug. 19, 2010

(30) Foreign Application Priority Data

Feb. 18, 2009 (JP) ................. P2009-034860

(51) Int. Cl.
*A47L 7/00* (2006.01)
*B08B 5/00* (2006.01)

(52) U.S. Cl.
USPC .............. 15/304; 15/314; 15/339; 134/167 R; 134/168 R (58) Field of Classification Search
USPC ................ 15/314, 315, 304, 339; 134/167 R, 134/168 R, 169 R
IPC ....................... A47L 7/00; B08B 5/00
See application file for complete search history.

(56) References Cited

U.S. PATENT DOCUMENTS

| 1,545,896 A | * | 7/1925 | Hanlon ...................... 134/167 R |
| 2,332,940 A | * | 10/1943 | Senke .............................. 15/1.7 |
| RE27,612 E | * | 4/1973 | Ruppel et al. ................. 239/227 |
| 4,805,650 A | * | 2/1989 | Yasui et al. ................. 134/57 R |
| 5,352,298 A | | 10/1994 | Moulder |
| 5,594,973 A | * | 1/1997 | Brusseleers et al. ............ 15/304 |
| 5,838,752 A | * | 11/1998 | Shimamura ................... 376/260 |
| 6,021,793 A | | 2/2000 | Moulder |
| 6,213,134 B1 | | 4/2001 | Pike |
| 7,343,640 B1 | * | 3/2008 | Robertson ....................... 15/315 |
| 2004/0134518 A1 | * | 7/2004 | Kraus et al. ..................... 134/18 |

FOREIGN PATENT DOCUMENTS

| DE | 25 08 918 | | 9/1976 | |
| DE | 43 36 078 A1 | | 4/1995 | |
| DE | 10 2006 016 314 B3 | | 9/2007 | |
| JP | 8-122484 | | 5/1996 | |
| JP | 9-174011 A | | 7/1997 | |
| JP | 10-20093 A | | 1/1998 | |
| JP | 2000-206288 A | | 7/2000 | |
| JP | 2001025451 A | * | 1/2001 | ............... A47L 9/24 |
| JP | 2004-354053 | | 12/2004 | |
| JP | 2009-109421 | | 5/2009 | |

* cited by examiner

*Primary Examiner* — Joshua J Michener
*Assistant Examiner* — Charissa Ahmad
(74) *Attorney, Agent, or Firm* — Oblon, Spivak, McClelland, Maier & Neustadt, L.L.P.

(57) ABSTRACT

A cleaning apparatus is generally composed of a suction unit provided with a suction source, a suction nozzle equipped with a suction port adapted to suck dust or like from a surface to be cleaned, a suction hose connected at one end to the suction nozzle and connected at another end to the suction unit, a low-center-of-gravity support member provided for the suction hose so as to serve as a fulcrum when the suction hose is bent and deformed, a wire member supported at a distal end by the suction nozzle and arranged along the suction hose, and a control unit used to bend and deform the suction hose by manipulating the wire member with the low-center-of-gravity support member serving as a fulcrum. This cleaning apparatus is specifically usable for a bottom surface of a reactor pressure vessel.

14 Claims, 12 Drawing Sheets

CLEANING APPARATUS

BACKGROUND OF THE INVENTION

1. Field of the Invention

The present invention relates to a cleaning apparatus, and more particularly, to a cleaning apparatus capable of cleaning narrow surfaces such as an inner surface of a bottom (i.e., reactor bottom) of a reactor pressure vessel in a boiling water reactor (BWR).

2. Description of the Related Art

The bottom portion of the reactor pressure vessel of a boiling water reactor has a hemispherical shape, and accordingly, in such a reactor bottom portion, it is unavoidable to accumulate dust or like containing radioactive substances. In order to clean the dust on the inner surface of the reactor bottom portion, it will be necessary to insert a suction hose in a reactor pressure vessel so as to extend to the reactor's inner bottom surface to thereby suck the dust together with reactor water.

As such a cleaning apparatus, there have been proposed a reactor bottom cleaning apparatus as disclosed in Japanese Patent Laid-Open Publication No. 2004-354053: Patent Document 1) and an in-core cleaning apparatus as disclosed in Japanese Patent Laid-Open Publication No. 8-122484: Patent Document 2).

The reactor bottom cleaning apparatus described in Patent Document 1 includes a rotary suction device, which is equipped with a suction port facing the reactor bottom, and which rotates at a constant radius with respect to the body of the apparatus within a predetermined plane by using a rotary actuator, for example.

On the other hand, the in-core cleaning apparatus described in Patent Document 2 has an operating pole from which a support pole and a crown unit are brunched. When the operating pole is rotated around its axis, the support pole rotates within a predetermined plane at a constant radius around the crown unit mounted on a jet pump so as to move a suction hose attached to the support pole.

However, a large number of short stubs (CRD stubs) are installed in a protruding condition at predetermined intervals on the reactor bottom to allow penetration of a control rod drive mechanism (hereinafter referred to as a CRD or CRD mechanism). Furthermore, an in-core monitor housing (ICM housing) is also installed on the reactor bottom to insert an in-core monitor (hereinafter referred to as an ICM).

Consequently, it is extremely troublesome to thoroughly clean between CRD stubs or around the ICM housing by means of a suction hose, requiring a great deal of time and effort.

Both the cleaning apparatus described in Patent Documents 1 and 2 require to rotate the suction port or suction hose at a constant radius within a predetermined plane. Even with these cleaning apparatus, a large number of protrusions including the CRD stubs and ICM housing get in the way of cleaning, inevitably taking a great deal of time and effort to clean the inner surface of the reactor bottom.

For example, the apparatus described in Patent Document 1 may clean between the CRD stubs by rotating the rotary suction device equipped with the suction port within a range of movement. However, in order to thoroughly clean an area accessible to the rotary suction device, it is required to rotate the rotary suction device while attentively moving the body of the apparatus equipped with the rotary suction device.

SUMMARY OF THE INVENTION

The present invention was conceived in consideration of the circumstances encountered in the prior art mentioned above and an object thereof is to provide a cleaning apparatus which can speedily, thoroughly, and reliably clean a surface narrowed due to locations or arrangement of a number of protrusions or like.

The above and other objections can be achieved according to the present invention by providing a cleaning apparatus comprising:

a suction unit provided with a suction source;

a suction nozzle equipped with a suction port adapted to suck dust from a surface of an object to be cleaned;

a suction hose connected at one end to the suction nozzle and connected at another end to the suction unit;

a low-center-of-gravity support member provided for the suction hose so as to serve as a fulcrum when the suction hose is bent and deformed;

a wire member, which is composed of at least one wire, supported at a distal end by the suction nozzle and arranged along the suction hose; and a control unit used to bend and deform the suction hose by manipulating the wire member with the low-center-of-gravity support member serving as a fulcrum.

In preferred embodiments of the above aspect, the wire member may include a plurality of the wires arranged in a circumferential direction of the suction nozzle.

It may be desired that the wire member is passed through a wire casing having a distal end supported by the low-center-of-gravity support member.

The wire member may be paired with a spring disposed to a position opposite to the wire member along the circumferential direction of the suction nozzle, and the spring is supported at one end by the suction nozzle and supported at another end by the low-center-of-gravity support member.

The suction hose may be provided with a wire guide which allows the wire member to pass therethrough, the wire guide being disposed between the suction nozzle and the low-center-of-gravity support member.

The low-center-of-gravity support member may be equipped with a wheel or ball caster.

The cleaning apparatus may further includes an untwisting mechanism mounted on the suction hose inside or near the low-center-of-gravity support member, the untwisting mechanism being disposed to be opposite to the suction nozzle so as to correct twisting of the suction hose.

The cleaning apparatus may further include a flexible bend limiter fitted around the suction hose at a position between the suction nozzle and the low-center-of-gravity support member.

It may be desired that the low-center-of-gravity support member is covered with a guide cover, the guide cover having a width of the guide cover set based on a width of a narrow and sloped surface to be cleaned.

The cleaning apparatus may further include an actuator installed at a portion in a vicinity of the low-center-of-gravity support member to pull or push the wire member.

The cleaning apparatus may further include a rear low-center-of-gravity support member which is located farther from the suction nozzle than is the low-center-of-gravity support member and is heavier than the low-center-of-gravity support member; and an operating wire supported at a distal end thereof by the low-center-of-gravity support member, so that the low-center-of-gravity support member is moved by using the rear low-center-of-gravity support member as a fulcrum through manipulation of the operating wire.

It may be desired that the low-center-of-gravity support member is mounted with a camera to be movable according to a travel direction of the suction nozzle.

It may be desired that the surface to be cleaned is an inner bottom surface of a reactor pressure vessel, and the suction hose is fixed to an operating pole made up of a plurality of pole segments which are connected in sequence and lowered by a suspending member located above the reactor pressure vessel, and an insertion rod is mounted on the suction hose at a portion between a fixing end of the operating pole and the low-center-of-gravity support member, the insertion rod being superior in elasticity and strength to the suction hose.

Further, the insertion rod may be fixed at one end to the operating pole and fixed at another end to the low-center-of-gravity support member or to a portion of the suction hose disposed in a vicinity of the low-center-of-gravity support member. In addition, it may be also desired that the low-center-of-gravity support member is connected to an operating rope extending above the reactor pressure vessel to be lifted upward.

According to the present invention of the aspect mentioned above, the suction nozzle can be moved in any desired direction around the low-center-of-gravity support member by pulling in or pushing the wire. Thus, a narrow surface to be cleaned due to a number of protrude portions can be cleaned speedily, thoroughly and reliably by sucking and removing dust and the like accumulated on the surface to be cleaned with the suction nozzle which can be moved freely.

The nature and further characteristic features may be made clearer from the following descriptions made with reference to the accompanying drawings.

DESCRIPTION OF THE PREFERRED EMBODIMENTS

Preferred embodiments of a cleaning apparatus according to the present invention will be described hereunder with reference to the accompanying drawings. However, the present invention is not limited to these embodiments. It is further to be noted that terms "upper", "lower", "right", "left" and the like terms are used herein with reference to the illustrated states or in an actual installation state.

First Embodiment

FIGS. 1 to 6

With reference to FIGS. 1 to 6 representing a first embodiment of the present invention, a cleaning apparatus 10 is used for cleaning, for example, during periodic inspection of a boiling water reactor to remove accumulated dust and the like containing radioactive substances from an inner surface 3 of a bottom portion 2 of a reactor pressure vessel 1 by sucking the dust together with reactor water.

Figure 1:
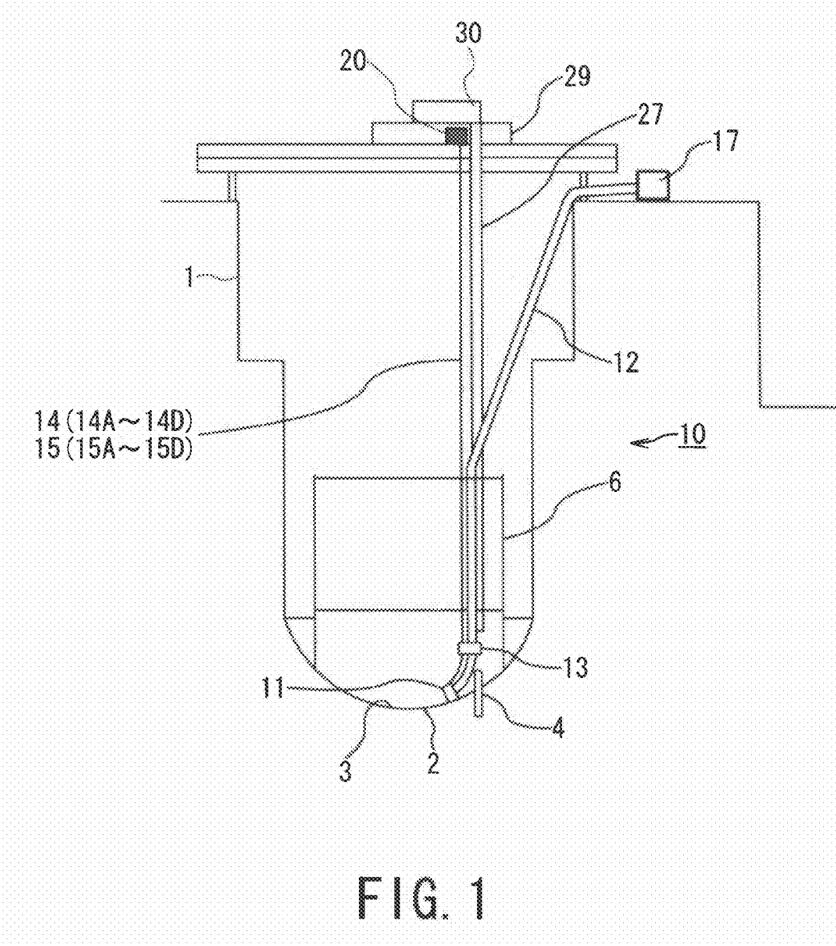
FIG. 1 is a schematic block diagram showing a condition in which an inner bottom surface of a reactor pressure vessel is cleaned using a cleaning apparatus according to a first embodiment of the present invention.
Figure 2:
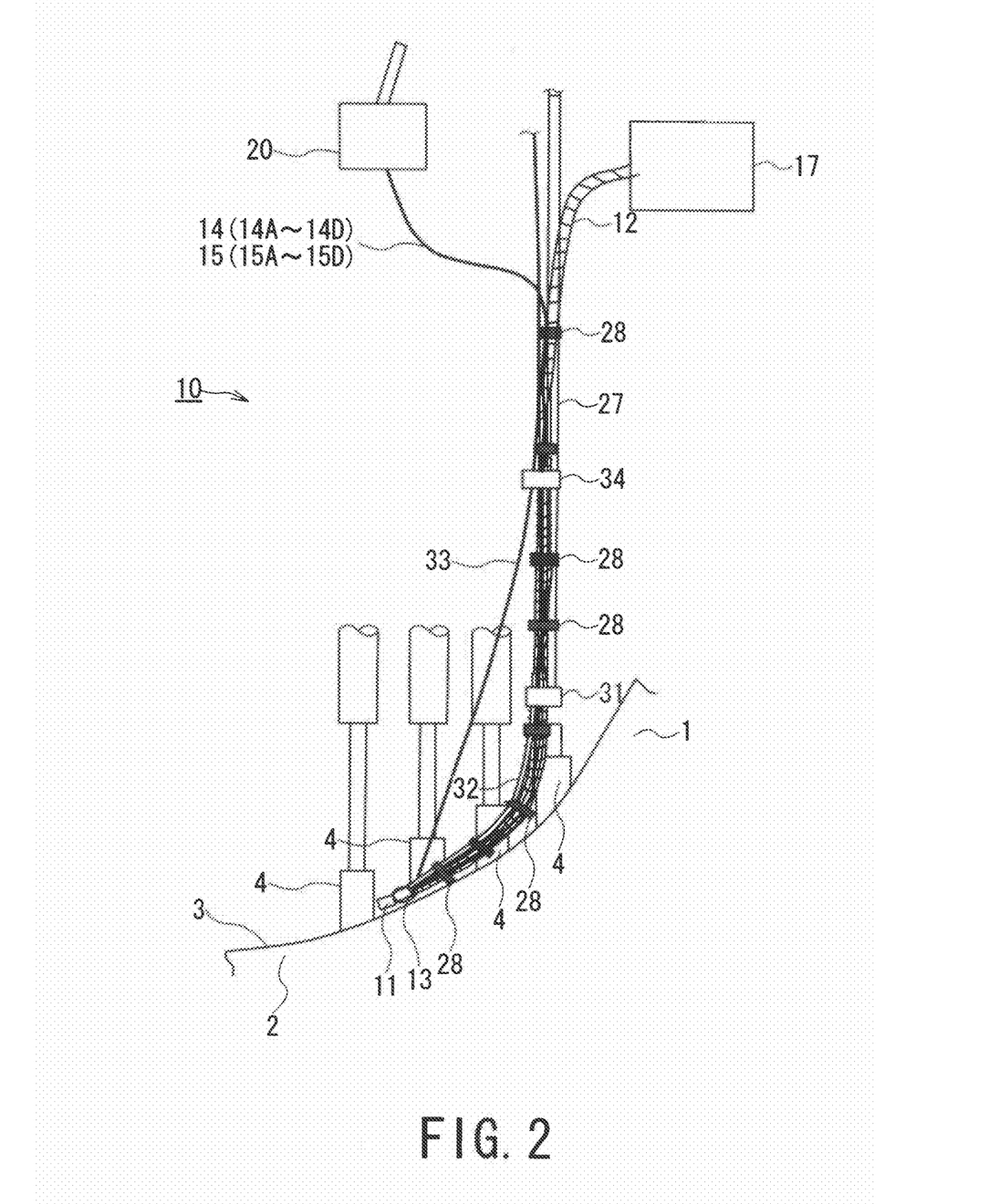
FIG. 2 is an enlarged view showing a portion of the cleaning device in the cleaning state in FIG. 1.
Figure 3:
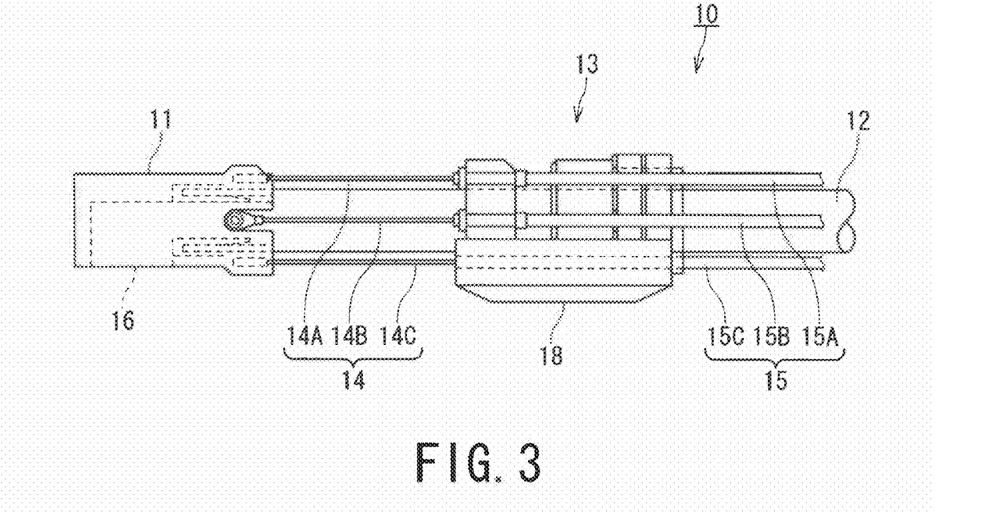
FIG. 3 is a side view of the cleaning apparatus shown in FIG. 1.

As shown in FIGS. 1 to 3, the cleaning apparatus 10 includes a suction nozzle 11, a suction hose 12, a low-center-of-gravity support member 13, wires 14, wire casings 15, and control unit 20.

A large number of CRD (Control Rod Drive) stubs 4 are installed in a protruding condition at predetermined intervals on the bottom portion 2 (i.e., reactor bottom) of the reactor pressure vessel 1. An ICM (In-core Monitor) housing 5 (FIG. 4) is also disposed in a protruding condition. Consequently, the reactor's inner bottom surface 3, which is a surface to be cleaned, provides a narrow environment in which the CRD stubs 4 and ICM housing 5 are installed in a protruding condition.

Incidentally, fuel assemblies, control rods, and a control rod drive (CRD) mechanism have been removed from inside a shroud 6 of the reactor pressure vessel 1 when the reactor bottom is cleaned by using the cleaning apparatus 10.

As shown in FIG. 3, a suction nozzle 11 of the cleaning apparatus 10, which is placed to face the reactor's inner bottom surface 3, is formed with a suction port 16 to suck dust from the reactor's inner bottom surface 3. The suction nozzle 11 is configured to be smaller in size and lighter in weight than the low-center-of-gravity support member 13 as described hereinlater. The suction nozzle 11 is fitted to one end of the suction hose 12.

The suction hose 12 has a configuration to be flexibly deformed and the other end of the suction hose 12 is connected to a suction unit 17 (FIG. 1) equipped with a suction pump as a suction source. The suction unit 17 removes dust and the like from the sucked reactor water and returns the cleaned reactor water into the reactor pressure vessel 1.

Figure 4:
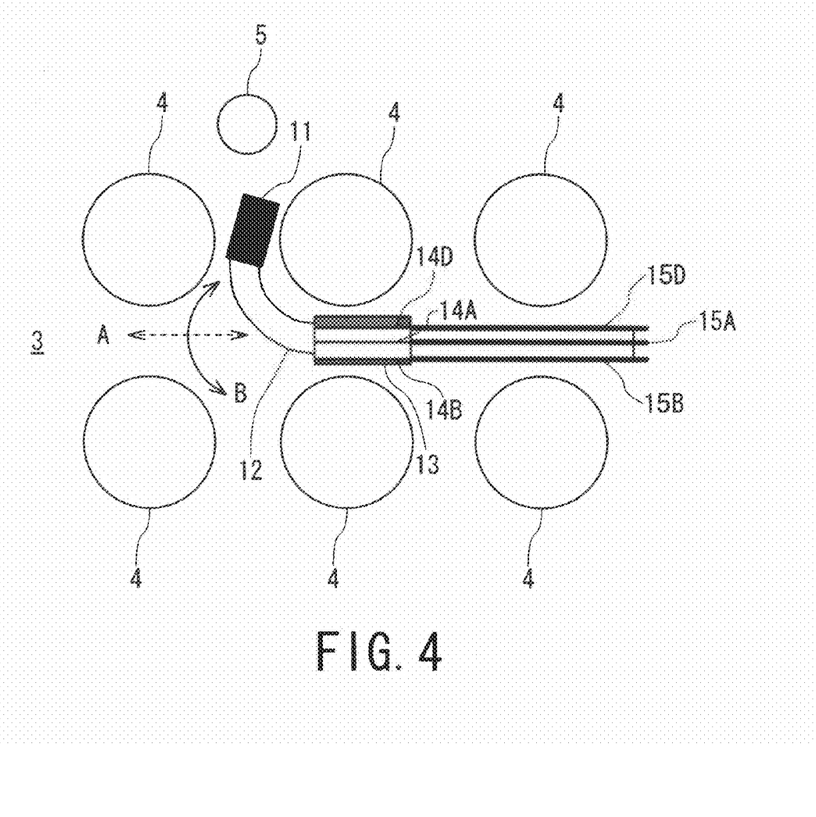
FIG. 4 is an explanatory diagram illustrating operation of the cleaning apparatus shown in FIG. 3.
Figure 5:
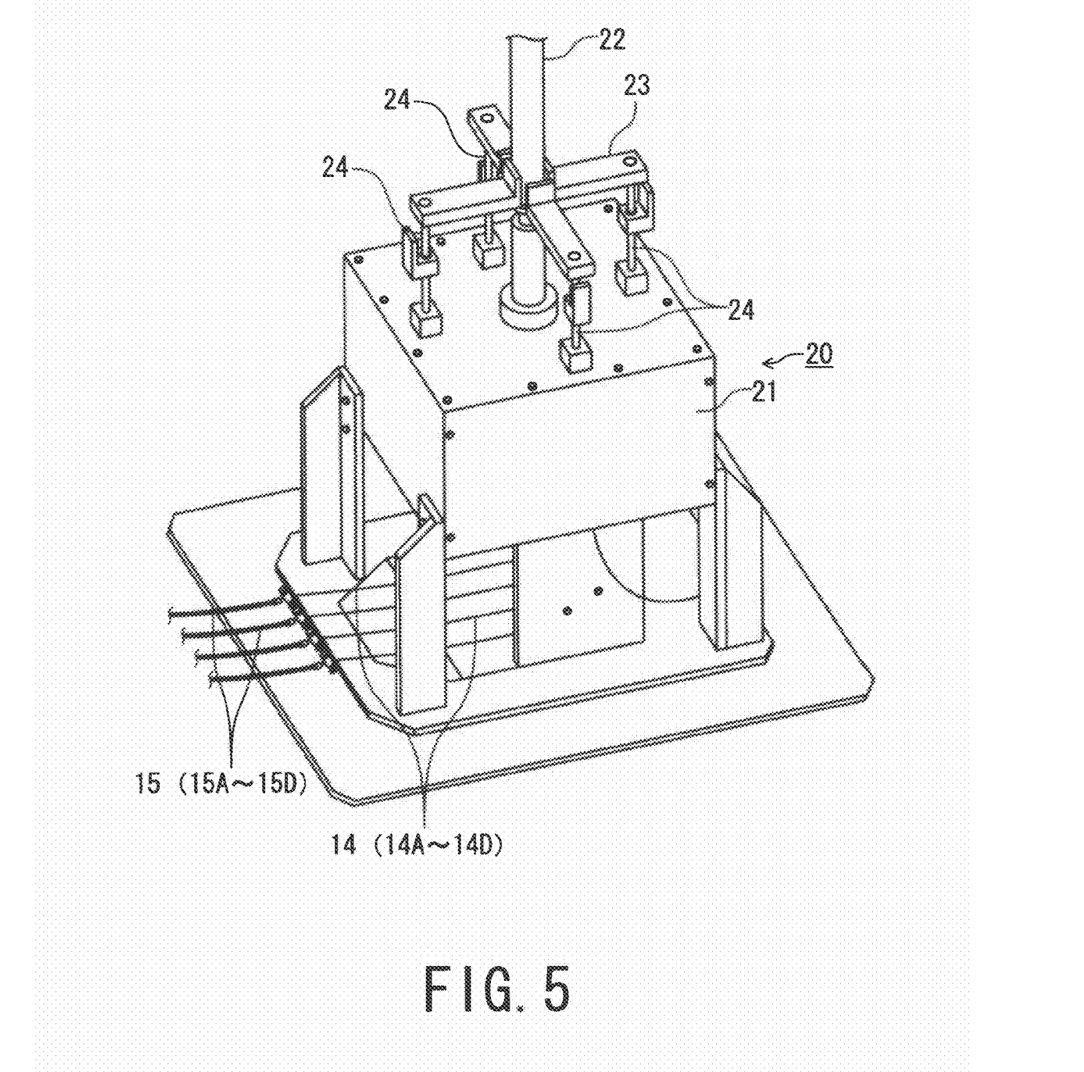
FIG. 5 is perspective view of a control unit or mechanism shown in FIG. 1.

As shown in FIG. 3, the low-center-of-gravity support member 13 is provided for the suction hose 12 at a portion in the vicinity of the suction nozzle 11. The low-center-of-gravity support member 13 is configured to be heavier than the suction nozzle 11 and has a gravity at its lower portion so as not to be easily turned over. Accordingly, the low-center-of-gravity support member 13 serves as a fulcrum when the suction hose 12 is bent and deformed. As shown in FIG. 4, the suction hose 12 is bent and deformed between the suction nozzle 11 and the low-center-of-gravity support member 13.

Furthermore, a slide plate 18 is mounted to the lower portion of the low-center-of-gravity support member 13 so as to allow the low-center-of-gravity support member 13 to slide over the reactor's inner bottom surface 3. Incidentally, although the suction nozzle 11 is shown as turning halfway around the CRD stub 4 in FIG. 4, the suction nozzle 11 may be arranged so as to circulate around the CRD stub 4 or bend behind the ICM housing 5 in FIG. 4.

As shown in FIG. 3, a plurality of wires 14 (four wires in this embodiment) are disposed with being spaced in the circumferential direction of the suction nozzle 11. Specifically, upper and lower wires 14A and 14C in FIG. 3 are placed opposite to each other while left and right wires 14B and 14D in FIG. 4 are placed opposite to each other. Distal ends of the wires 14A to 14D are supported at four locations around the suction nozzle 11 at equal intervals.

Furthermore, the wires 14A, 14B, 14C and 14D are protected by wire casings 15A, 15B, 15C, and 15D, respectively, and disposed along the suction hose 12. Distal ends of the wire casings 15A to 15D are supported at four locations around the low-center-of-gravity support member 13 with being spaced at equal intervals. The proximal ends of the wire casings 15A to 15D are supported by a frame 21 of the control unit 20 shown in FIGS. 1, 2, 5 and 6.

The control unit 20 is used to manipulate the wires 14A to 14D, being equipped with a link mechanism mounted on the frame 21, where the link mechanism includes a cross-shaped first link 23 with a control lever 22 provided at the center, and four second links 24 which are pivotably supported at tips of the cross-shaped first link 23. A pulley 25 is rotatably mounted on a lower end of each second link 24. The wires 14A to 14D have their proximal ends supported by the frame 21 of the control unit 20 and have their proximal portions looped over the respective pulleys 25.

Figure 6:
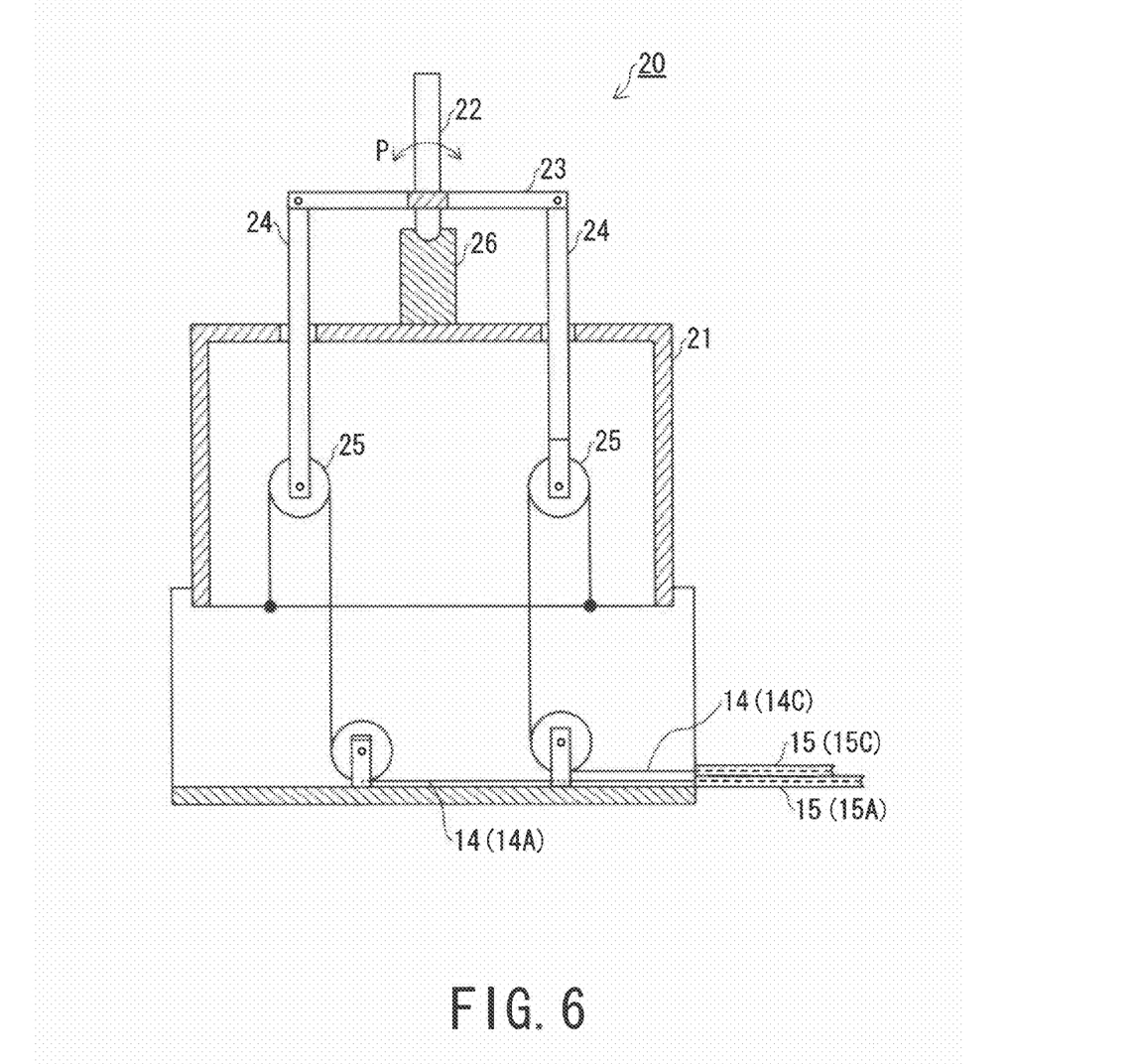
FIG. 6 is an illustration of a longitudinal sectional view of the control unit shown in FIG. 5.

When the control lever 22 is manipulated, for example, in the direction of arrow P in FIG. 6, the first link 23 swings using a pivot bearing 26 fixed to the top surface of the frame 21 as a fulcrum. As the first link 23 swings, the second links 24 move up and down in the state shown in FIG. 6, raising and lowering the pulleys 25. Accordingly, the wires 14A to 14D looped around the raised pulleys 25 are pulled, and on the other hand, the wires 14A to 14D looped around the lowered pulleys 25 are pushed out.

When the wires 14A to 14D are pulled or pushed through the manipulation of the control unit 20, as shown in FIG. 4, the portion of the suction hose 12, which is located ahead of the low-center-of-gravity support member 13, is bent and deformed with the low-center-of-gravity support member 13 being a fulcrum. This makes it possible to move the suction nozzle 11 at the distal end of the suction hose 12 in any desired direction, including up and down directions and right and left directions, around the low-center-of-gravity support member 13. At this time, since opposite ends of the wire casings 15A to 15D are supported by the low-center-of-gravity support member 13 and the frame 21 of the control unit 20, respectively, the reaction forces with respect to the operating forces acting on the wires 14A to 14D are supported.

When the cleaning apparatus 10 configured as described above is used to clean the inner surface 3 of the bottom portion of the reactor pressure vessel 1, the suction hose 12 is fixed to an operating pole 27 by using fastening members 28 (e.g., adhesive tape or belts), in which the operating pole 27 is composed of a plurality of pole segments joined together as shown in FIGS. 1 and 2. That is, a truck 29 such as a refueling machine runs freely above the reactor pressure vessel 1 and a crane 30 is installed on the truck 29. The crane 30 lowers the multiple pole segments of the operating pole 27 into the reactor pressure vessel 1 by joining them one after another.

The suction hose 12 of the cleaning apparatus 10 is fixed to the lowered operating pole 27.

Together with the suction hose 12, the wire casings 15A to 15D are also fixed to the operating pole 27 by using the fastening members 28. However, the wires 14A to 14D are not fixed to the operating pole 27 and are movable in the respective wire casings 15A to 15D.

Further, insertion rods 32 are mounted to the suction hose 12 of the cleaning apparatus 10 securely between a fixing end 31 and the low-center-of-gravity support member 13 by using the fastening members 28 in a manner such that the suction hose 12 and wire casings 15A to 15D are fixed to the lowermost pole segment of the operating pole 27 at the fixing end 31. The insertion rods 32, like fish tapes, are superior in elasticity and rigidity or strength more than the suction hose 12. Furthermore, each of the insertion rods 32 is fixed at one end to the lowermost pole segment of the operating pole 27 and fixed at the other end to the low-center-of-gravity support member 13 or the suction hose 12 near the low-center-of-gravity support member 13.

Since the insertion rod 32 is fixed to the suction hose 32, the operating pole 27 composed of the pole segments joined one after another is lowered into the reactor pressure vessel 1 in the suspended state, thereby pushing forward the suction nozzle 11, the suction hose 12 and the low-center-of-gravity support member 13 on the reactor's inner bottom surface 3. In this time, the insertion rod 32, which are mounted securely on the suction hose 12, presses the suction hose 12 while being deformed flexurally. According to such operation, the insertion rod 32 assists the forward pushing of the suction nozzle 11, the suction hose 12, and the low-center-of-gravity support member 13.

In particular, since a portion of the suction hose 12 near the portion attached to the fixing end 31 in the lowermost pole segment of the operating pole 27 is a portion most flexibly deformed, a plurality of insertion rods 32 are mounted securely to this portion of the suction hose 12, thus increasing the pressing force by which the insertion rods 32 press the suction hose 12. Instead of securely mounting the plural insertion rods 32, this portion of the insertion rod 32 near the portion at which the suction hose 12 is attached to the fixing end 31 in the lowermost pole segment of the operating pole 27 may be increased in strength compared to the other portion.

The configuration in which the insertion rods 32 are fixed to the suction hose 12 near the low-center-of-gravity support member 13 increases leeway for relative twist between the suction hose 12 and the low-center-of-gravity support member 13 compared to the configuration in which the insertion rods 32 are fixed to the low-center-of-gravity support member 13.

An operating rope 33 is connected to the low-center-of-gravity support member 13. The operating rope 33 is inserted through and guided by a guide 34 mounted to the operation pole 27 so as to extend above the reactor pressure vessel 1 and is connected to the truck 29. Accordingly, when the truck 29 moves, it allows the operating rope 33 to lift the low-center-of-gravity support member 13. When lifted by the operating rope 33, the low-center-of-gravity support member 13 can get up from a lying position or go over bumps.

Next, operation of the cleaning apparatus 10 will be described.

As shown in FIGS. 1 and 2, the crane 30 joins a plurality of pole segments one after another and lowers the operating pole 27 into the reactor pressure vessel 1. In this operation, the suction hose 12 of the cleaning apparatus 10 and wire casings 15A to 15D are secured to the operating pole 27 by using the fastening members 28. Furthermore, the insertion rods 32 are secured to the suction hose 12 between the low-center-of-gravity support member 13 and the lowermost pole segment of the operating pole 27 by using the fastening members 28.

When the operating pole 27 is lowered in this way, the suction nozzle 11, the suction hose 12 and the low-center-of-gravity support member 13 of the cleaning apparatus 10 are lowered to the reactor's inner bottom surface 3 of the reactor pressure vessel 1 and then pushed forward and moved among the large number of CRD stubs 4 and ICM housing 5 on the reactor bottom portion in the direction of arrow "A" in FIG. 4. According to this operation, the low-center-of-gravity support member 13 slides over the reactor's inner bottom surface 3 with the slider plate 18 placed in contact with the reactor's inner bottom surface 3.

During the movement of the suction nozzle 11, the suction hose 12 and the low-center-of-gravity support member 13, the operator pulls one of the pair of upper and lower wires 14A and 14C while pushing the other one or pulls one of the pair of left and right wires 14B and 14D while pushing the other one, and thereby, the suction hose 12 is bent by using the low-center-of-gravity support member 13 as a fulcrum, causing the suction nozzle 11 to move (oscillate) in a desired direction including up, down, right, and left directions while voiding the CRD stubs 4 and ICM housing 5.

For example, by pulling the wire 14A and pushing the wire 14C, the operator bends the suction hose 12 by using the low-center-of-gravity support member 13 as a fulcrum and lifts the suction nozzle 11. Similarly, by pulling one of the wires 14B and 14D and pushing the other one, the operator turns the suction nozzle 11 to the right or left as indicated by arrow "B".

The up-and-down movement and left-and-right movement can be made simultaneously. For example, as shown in FIG. 4, with the suction nozzle 11 turned to the vicinity of the ICM housing 5, if it is desired to move the suction nozzle 11 in an opposite direction along the arrow "B" or in the forward direction along the arrow "A", the operator manipulates the pair of left and right wires 14B and 14D while manipulating and controlling the pair of upper and lower wires 14A and 14C. In this way, the operator moves the suction nozzle 11 in an oscillating manner by lifting the suction nozzle 11 and dodging CRD stubs 4.

In this way, by moving the suction nozzle 11, which is smaller and lighter than the low-center-of-gravity support member 13, while avoiding the CRD stubs 4 and ICM housing 5, dust and the like accumulated on the reactor's inner bottom surface 3 narrowed by the protruding CRD stubs 4 and ICM housing 5 can be sucked together with reactor water by the suction nozzle 11, thus cleaning the reactor's inner bottom surface 3.

Therefore, according to the present embodiment, the following advantageous effects (1) to (3) are attainable.

(1) According to the cleaning apparatus 10 of this first embodiment, when the wires 14A to 14D are pulled or pushed, the suction hose 12 is bent and deformed with the low-center-of-gravity support member 13 serving as a fulcrum, and the suction nozzle 11 moves in any desired direction, including up, down, right, and left directions, around the low-center-of-gravity support member 13. Therefore, the reactor's inner bottom surface 3, even if narrowed by the location of the protruding CRD stubs 4 and ICM housing 5, can be cleaned speedily, thoroughly and reliably by sucking and removing the dust and the like accumulated on the reactor's inner bottom surface 3 by the freely-movable suction nozzle 11.

(2) Since the insertion rods 32 are securely mounted to the suction hose 12 of the cleaning apparatus 10 between the fixing end 31 in the lowermost pole segment of the operating pole 27 and the low-center-of-gravity support member 13 as shown in FIG. 2. Accordingly, when the suction nozzle 11, the suction hose 12 and the low-center-of-gravity support member 13 are pushed forward on the reactor's inner bottom surface 3 by the lowering operating pole 27, the insertion rods 32 press the suction hose 12 while being flexibly deformed to thereby assist the forward pushing motion to the suction nozzle 11, the suction hose 12 and the low-center-of-gravity support member 13. This ensures the reliable movements of the suction nozzle 11, the suction hose 12 and the low-center-of-gravity support member 13 on the reactor's inner bottom surface 3.

(3) The low-center-of-gravity support member 13 of the cleaning apparatus 10, which is lifted by the truck 29 via the operating rope 33, can be raised up reliably from a lying position and made to go over bumps easily and reliably.

Incidentally, the wires 14 may be paired with springs placed opposite to the wires 14 along the circumferential direction of the suction nozzle 11. Specifically, one of the pair of upper and lower wires 14A and 14C (for example, the wire 14C) may be changed to a tension spring and one of the pair of left and right wires 14B and 14D (i.e., the wire 14D) may be changed to a tension spring. In this case, the tension springs are held at one end by the suction nozzle 11, and at the other end, by the low-center-of-gravity support member 13. That is, if a spring and a wire are installed in opposing relation to each other with the spring always pulling the suction nozzle 11, by simply pulling and pushing the wire, it is possible to implement a function similar to that of the configuration in which two wires are placed opposite to each other.

Furthermore, although according to the present embodiment, four wires 14 are supported at four locations around the suction nozzle 11 spaced at equal intervals, three wires may be supported at three locations around the suction nozzle 11 spaced at equal intervals. This configuration also allows the suction nozzle 11 to move three-dimensionally in an oscillating manner.

Alternatively, a single wire 14 may be supported by the suction nozzle 11 with a spring placed opposite to the wire 14 along the circumferential direction of the suction nozzle 11. This simple configuration with only a single wire allows the suction nozzle 11 to move two-dimensionally in an oscillating manner.

Second Embodiment

FIGS. 7 to 10

The second embodiment will be described hereunder with reference to FIGS. 7 to 10.

In the second embodiment, the same components as those in the first embodiment are denoted by the same reference numerals as the corresponding components in the first embodiment, and description thereof will be simplified or omitted.

A cleaning apparatus 40 according to this second embodiment differs from the cleaning apparatus 10 according to the first embodiment in that wire guides 41, an untwisting mechanism 42, a bend limiter (a member for preventing or limiting bending or curbing motion) 43, and a guide cover 44 are additionally disposed, and that wheels 45 or ball casters are disposed in place of the slider plate 18 of the low-center-of-gravity support member 13.

Figure 7:
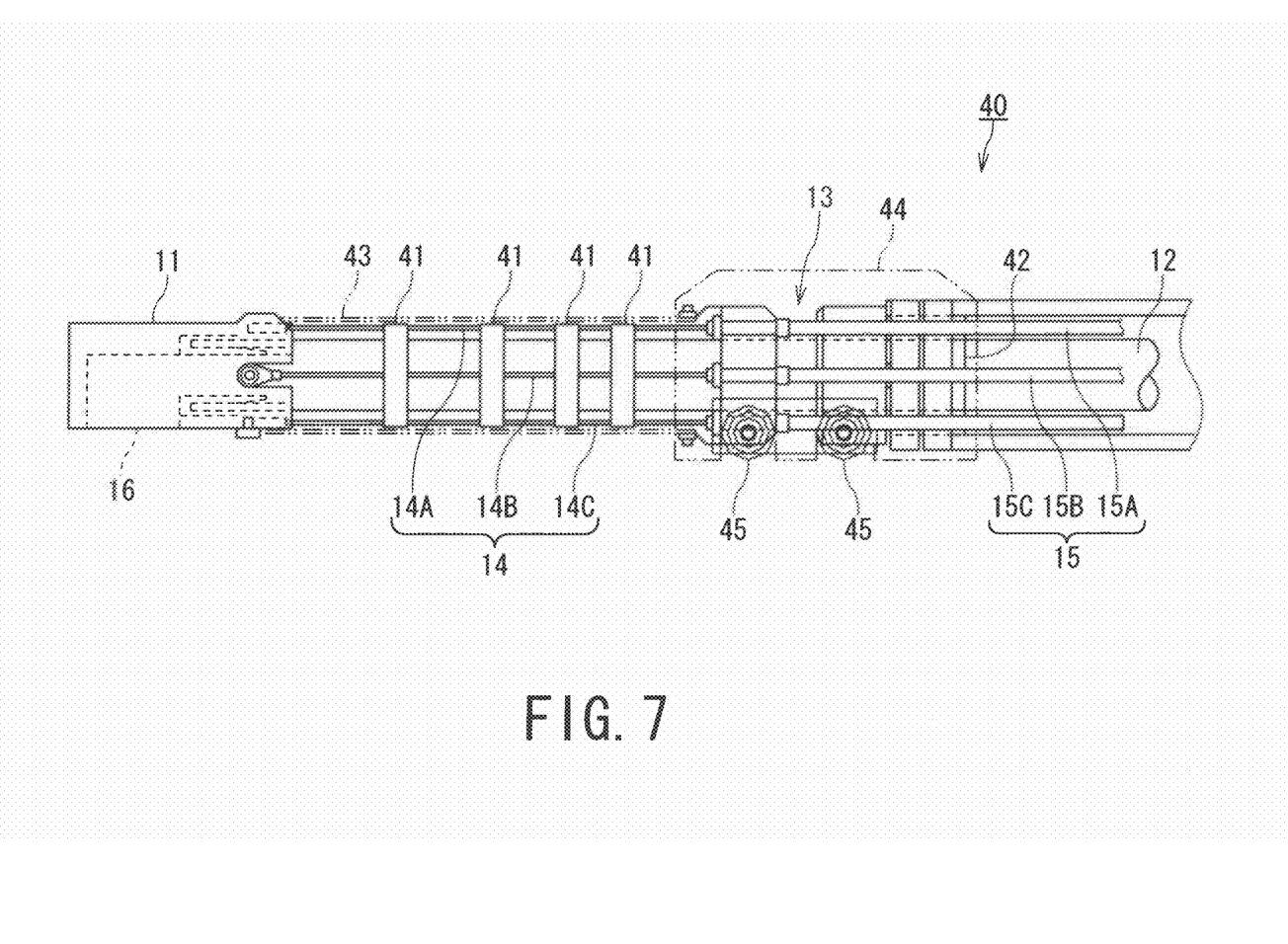
FIG. 7 is a side view of a cleaning apparatus according to a second embodiment of the present invention.
Figure 8:
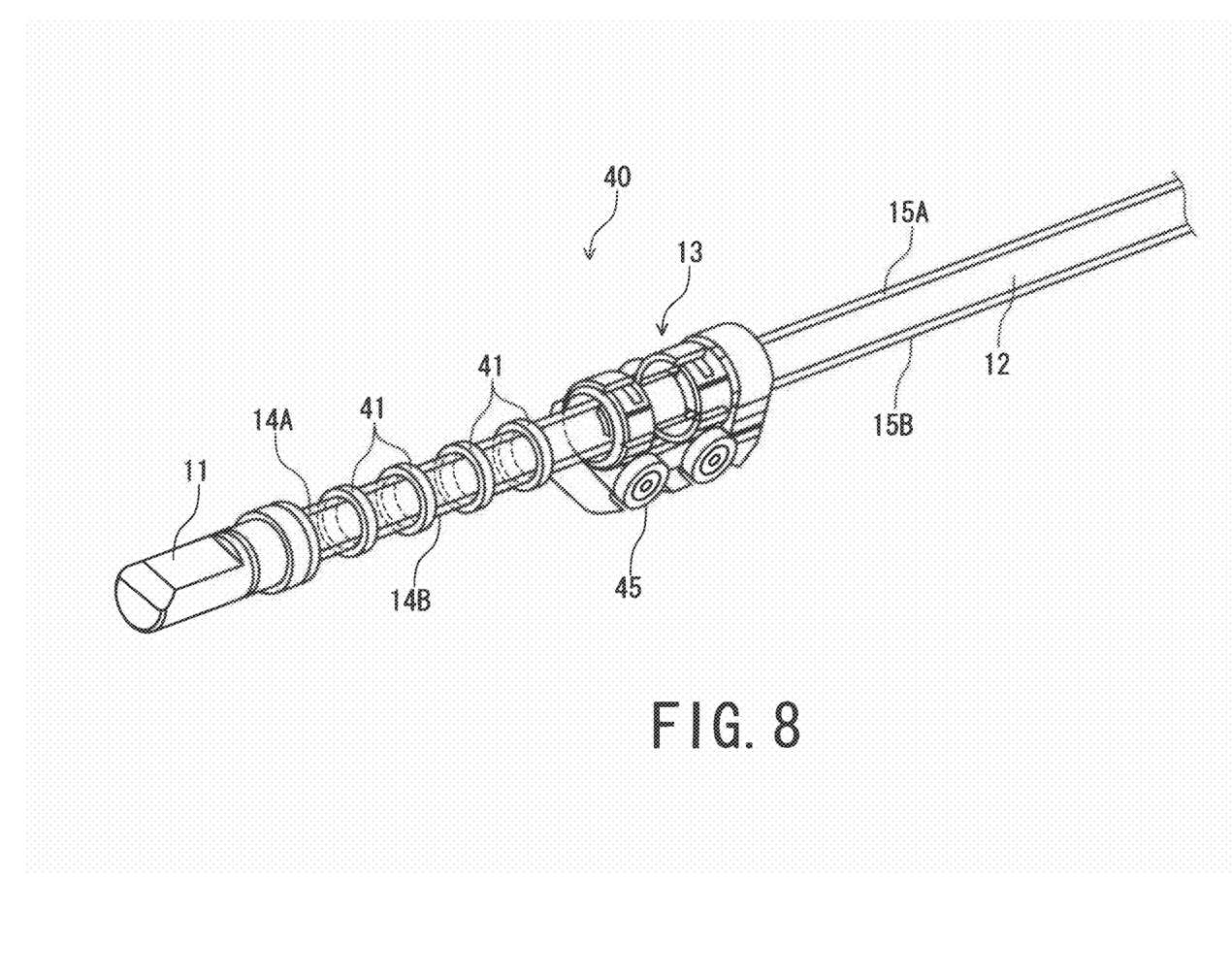
FIG. 8 is perspective view showing an essential portion of the cleaning apparatus shown in FIG. 7.

As shown in FIGS. 7 and 8, a plurality of wire guides 41 are disposed to a portion, of the suction hose 12, bent and deformed between the suction nozzle 11 and the low-center-of-gravity support member 13. The wire guides 41 allow the wires 14A to 14D to pass therethrough.

The untwisting mechanism 42 is installed in or near the low-center-of-gravity support member 13, to a position opposite to the suction nozzle 11, and is connected to the suction hose 12 split in the longitudinal direction so as to correct the twisting of the suction hose 12. Preferably, the untwisting mechanism 42 is, for example, a rotary joint, a swivel joint, or a quick-connect coupler.

Figure 9:
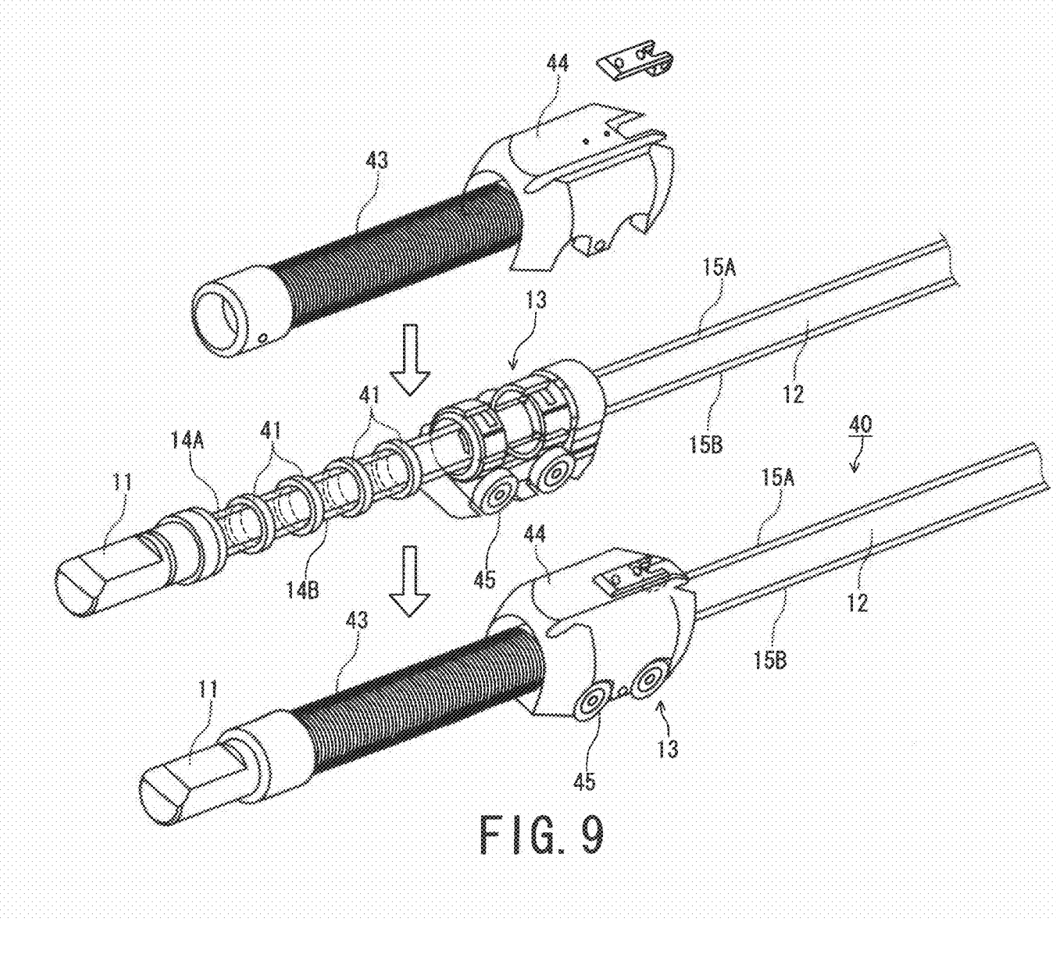
FIG. 9 is a perspective developed view showing an assembling of the cleaning apparatus shown in FIG. 7.

As shown in FIGS. 7 and 9, the bend limiter 43 is fitted to a portion of the suction hose 12 between the suction nozzle 11 and the low-center-of-gravity support member 13. The bend limiter 43 is provided with flexibility and is capable of bending and deforming together with the suction hose 12. Preferably, the bend limiter 43 is, for example, a coil spring or bellows cover wound around the suction hose 12.

Figure 10:
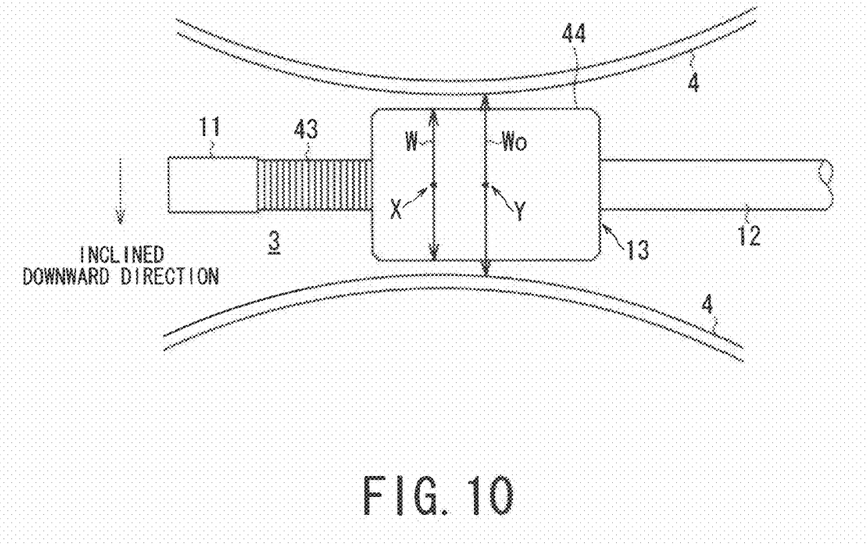
FIG. 10 is a plan view showing a relationship between the cleaning apparatus in FIG. 9 and CRD stubs.

The guide cover 44 is mounted over the low-center-of-gravity support member 13 to protect the same. As shown in FIG. 10, a width W of the guide cover 44 is set based on a minimum width W0 between opposing surfaces of the CRD stubs 4 on the reactor's narrow sloping inner bottom surface 3. Specifically, the width W of the guide cover 44 is set slightly smaller than the width W0 between the CRD stubs 4.

Thus, the present embodiment further provides following advantages (4) to (7) in addition to the advantages (1) to (3) of the first embodiment.

(4) With the cleaning apparatus 40 of the second embodiment, even if the bendable and deformable portion of the suction hose 12 between the suction nozzle 11 and the low-center-of-gravity support member 13 is lengthened, the wire guides 41 allow the wires 14A to 14D to pass therethrough, and thereby, prevent the suction hose 12 from being separated from the wires 14A to 14D. This makes it easy to move the suction nozzle 11 deep into the narrowed portion.

(5) The untwisting mechanism 42, which is installed in or near the low-center-of-gravity support member 13 to correct twisting of the suction hose 12, can prevent the low-center-of-gravity support member 13 from being turned over due to the twisting of the suction hose 12.

(6) The flexible bend limiter 43, which is fitted around the bendable and deformable portion of the suction hose 12 between the suction nozzle 11 and the low-center-of-gravity support member 13, limits the bending radius of the suction hose 12, thereby making it possible to prevent the suction hose 12 from being locally bent sharply.

(7) Since the guide cover 44 is mounted around the low-center-of-gravity support member 13, the low-center-of-gravity support member 13 can be prevented from getting tripped when moving among the CRD stubs 4 and ICM housing 5, thereby ensuring the smooth movement of the low-center-of-gravity support member 13.

Furthermore, since the width W of the guide cover 44 is set based on the width W0 between the CRD stubs 4 on the reactor's narrow sloping inner bottom surface 3 as shown in FIG. 10, even if the reactor's inner bottom surface 3 is sloped, the cleaning apparatus 40 can be moved with the center position X in the width direction of the cleaning apparatus 40 being kept close to the center position Y in the width direction of the reactor's inner bottom surface 3. Specifically, when the cleaning apparatus 40 is moved perpendicularly to the sloping direction of the reactor's inner bottom surface 3, if the slop is sharp, the cleaning apparatus 40 takes a position leaning against the CRD stubs 4. In this case, as the width W of the guide cover 44 is set slightly smaller than the width W0 between the CRD stubs 4, the center position X in the width direction of the cleaning apparatus 40 can be kept close to the center position Y in the width direction of the reactor's inner bottom surface 3. Therefore, even on a sloping surface, the cleaning apparatus 40 can move properly among the CRD stubs 4, remaining close to the center of the CRD stubs 4.

Third Embodiment

Figure 11:
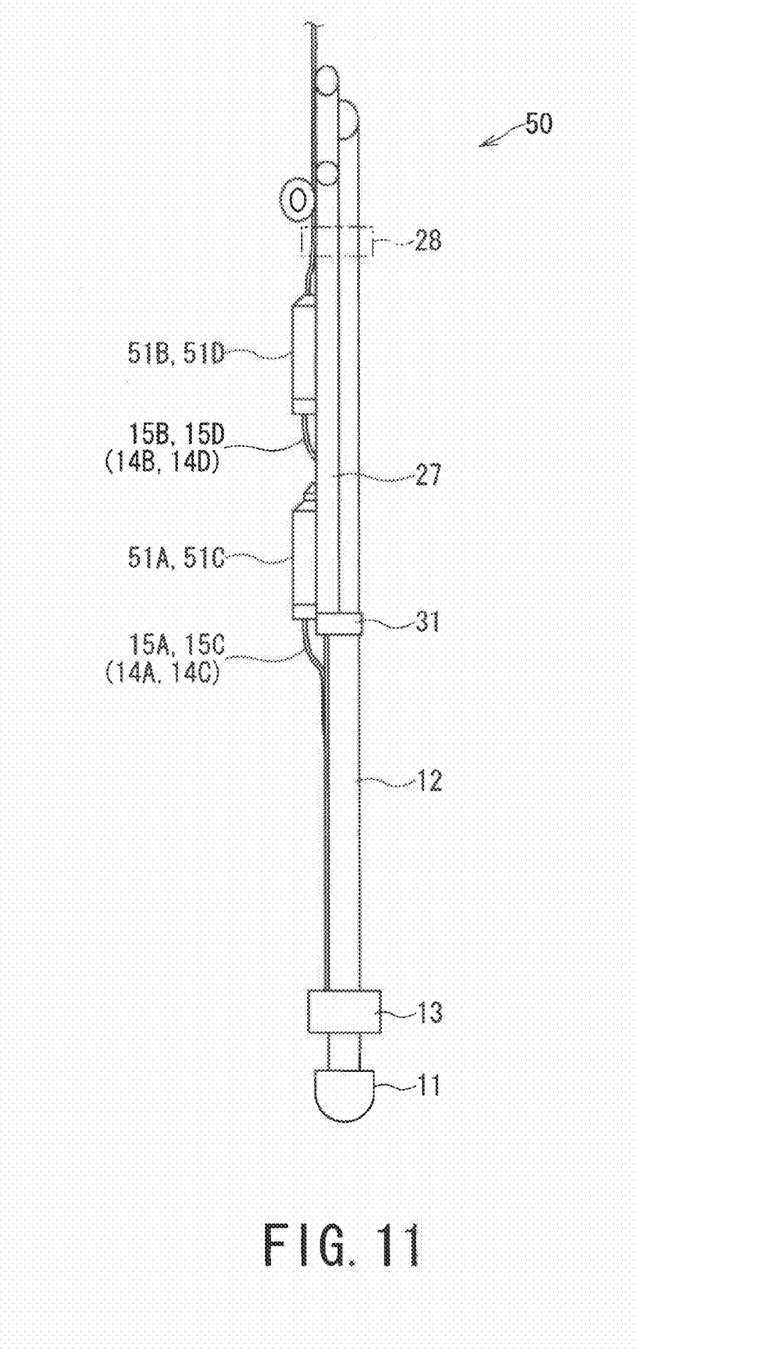
FIG. 11 is a side view of a cleaning apparatus according to a third embodiment of the present invention.
Figure 12:
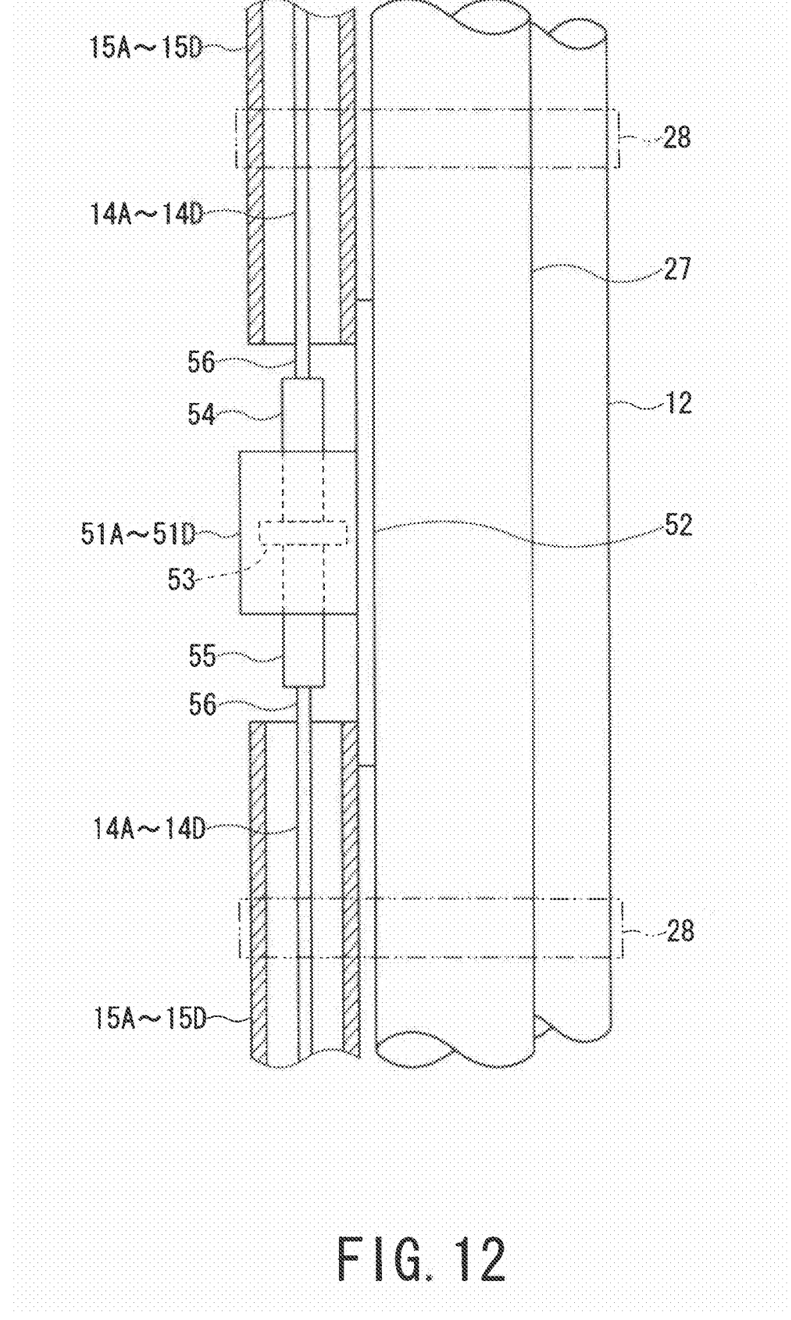
FIG. 12 is an illustrated sectional view showing a portion of the cleaning apparatus shown in FIG. 11.

FIGS. 11 and 12

FIG. 11 is a side view of a cleaning apparatus according to a third embodiment of the present invention. FIG. 12 is a partial sectional view of the cleaning apparatus shown in FIG. 11. In the third embodiment, the same components as those in the first embodiment are denoted by the same reference numerals as the corresponding components in the first embodiment, and description thereof will be simplified.

A cleaning apparatus 50 according to this third embodiment differs from the first embodiment in that the wires 14A, 14B, 14C and 14D are configured to be pulled or pushed by actuators 51A, 51B, 51C and 51D, respectively, installed near the low-center-of-gravity support member 13.

That is, the actuators 51A to 51D are installed on the lowermost pole segment of the operating pole 27, i.e., the pole segment closest to the low-center-of-gravity support member 13. The suction hose 12 and wire casings 15A to 15D are fixed to the operating pole 27 including the lowermost pole segment using the fastening members 28, as in the case of the first embodiment. The wire casings 15A to 15D are also fixed to bases 52 of the actuators 51A to 51D, respectively, as shown in FIG. 12. The actuators 51A to 51D are, for example, air cylinders, and split ends 56 of each of the wires 14A to 14D are connected to opposite piston rods 54 and 55 integrated with a piston 53.

The wires 14A to 14D can be pulled or pushed by the respective actuators 51A to 51D as well as pulled or pushed via the control unit 20 as in the first embodiment. Specifically, the wires 14A to 14D are pulled or pushed by the respective actuators 51A to 51D and the control unit 20. Incidentally, the wires 14A to 14D may be pulled or pushed using only the control unit 20 without supplying a working fluid, such as air, to the actuators 51A to 51D.

On the other hand, the wires 14A to 14D may be pulled or pushed using only the actuators 51A to 51D by replacing the control unit 20 with a controller of the actuators 51A to 51D. That is, the wires 14A to 14D may be configured to be pulled or pushed via the actuators 51A to 51D through manipulation of a controller, as a control unit, of the actuator 51A to 51D.

Thus, the present third embodiment further provides an advantageous effect (8) in addition to the advantages (1) to (3) of the first embodiment.

(8) Since the wires 14A to 14D are pulled or pushed by the respective actuators 51A to 51D installed near the low-center-of-gravity support member 13, the wires 14A to 14D can be pulled or pushed at locations where the wires 14A to 14D are subjected to smaller frictional forces than a case in which the wires are pulled or pushed by using only the control unit 20 located away from the low-center-of-gravity support member 13. Thus, the use of the actuators 51A to 51D allows the wires 14A to 14D to be manipulated easily by using small operating forces. When the control unit 20 is used in conjunction with the actuators 51A to 51D, the actuators 51A to 51D may be used as auxiliary power sources.

Further, if servo motors are used as the actuators 51A to 51D for electrical control, the suction nozzle can be made to oscillate more precisely.

Fourth Embodiment

Figure 13:
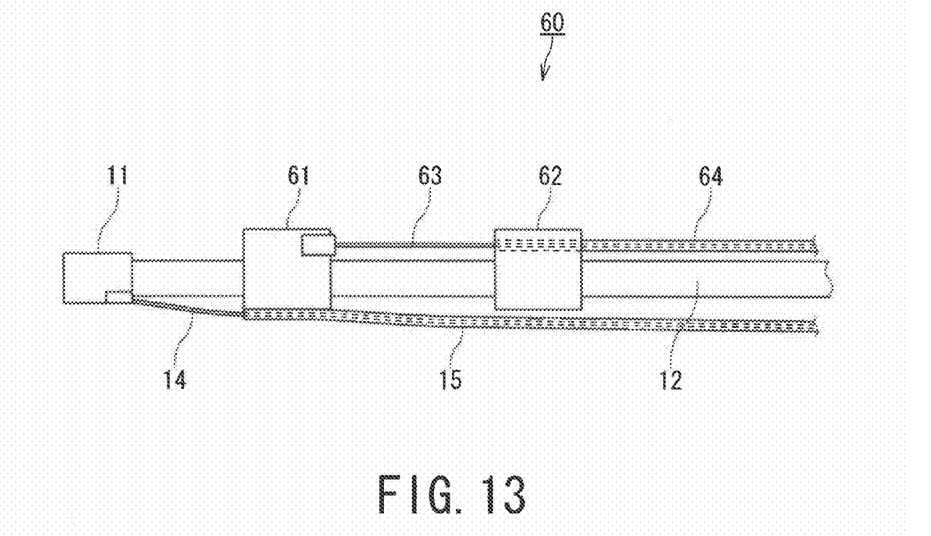
FIG. 13 is a schematic side view of a cleaning apparatus according to a fourth embodiment of the present invention.

FIG. 13

FIG. 13 is a schematic side view of a cleaning apparatus according to a fourth embodiment of the present invention. In the fourth embodiment, the same components as those in the first embodiment are denoted by the same reference numerals as the corresponding components in the first embodiment, and description thereof will be simplified or omitted.

A cleaning apparatus 60 according to this fourth embodiment differs from the first embodiment in that a plurality of (e.g., two) low-center-of-gravity support members are disposed on the suction hose 12, and in that a front low-center-of-gravity support member 61 closer to the suction nozzle 11 is movable in any direction, including up, down, right and left directions, around a rear low-center-of-gravity support member 62 (serving as a fulcrum) by the operation of dedicated operating wires 63, at which the rear low-center-of-gravity support member 62 is located farther from the suction nozzle 11.

In this case, the rear low-center-of-gravity support member 62 is constructed to be heaver than the front low-center-of-gravity support member 61. The operating wires 63 are passed through wire casings 64 with the distal ends of the operating wires 63 supported by the front low-center-of-gravity support member 61. The distal ends of the wire casings 64 are supported by the rear low-center-of-gravity support member 62.

Although a single operating wire 63 and a single wire casing 64 are illustrated in FIG. 13, the operating wires 63 and wire casings 64 are supported at four locations (upper, lower, left, and right locations) around the front low-center-of-gravity support member 61, being spaced at equal intervals, and are pulled or pushed via a control unit, not shown, as in the case of the wires 14 and wire casings 15. However, the single operating wire 63 and the single wire casing 64 may be used alternatively.

Further, although a single wire 14 and a single wire casing 15 are also illustrated in FIG. 13, four wires 14 and four wire casings 15 may be placed around the suction nozzle 11 as in the case of the first embodiment. According to this fourth embodiment, the four wire casings 15 are supported at four locations around the front low-center-of-gravity support member 61, being spaced at equal intervals.

The operating wires 63 may be manipulated or controlled by using, for example, the same structure as the control unit 20 or actuators 51A to 51D.

Thus, in addition to the advantageous effects (1) to (3) of the first embodiment, this fourth embodiment provides a following further advantageous effect (9).

(9) The front low-center-of-gravity support member 61 is located to be movable in any direction, including up, down, right, and left directions, around the rear low-center-of-gravity support member 62 through operation of the operating wires 63, and the suction nozzle 11 is located also to be movable in any direction, including up, down, right, and left directions, around the front low-center-of-gravity support member 61 through the operation of the wires 14. Accordingly, the suction hose 12 can be bent and deformed in two stages between the suction nozzle 11 and front low-center-of-gravity support member 61 and between the front low-center-of-gravity support member 61 and rear low-center-of-gravity support member 62, thus making it possible to move the suction nozzle 11 to places further narrower than the place in the first embodiment.

Fifth Embodiment

Figure 14:
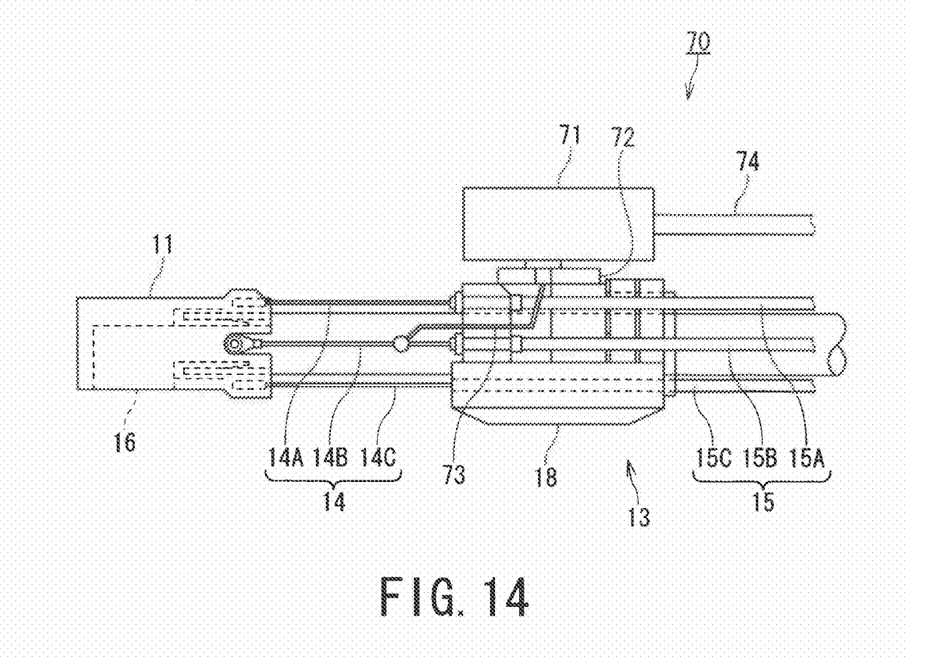
FIG. 14 is a side view of a cleaning apparatus according to a fifth embodiment of the present invention.

FIG. 14

FIG. 14 is a side view of a cleaning apparatus according to a fifth embodiment of the present invention. In the fifth embodiment, the same components as those in the first embodiment are denoted by the same reference numerals as the corresponding components in the first embodiment, and description thereof will be simplified or omitted.

The cleaning apparatus 70 according to the present embodiment differs from the first embodiment in that a camera 71 is mounted on the low-center-of-gravity support member 13 in such a way as to be able to move according to a travel direction of the suction nozzle 11.

Specifically, the camera 71 is mounted on the low-center-of-gravity support member 13 through a swivel mechanism 72 which is connected to the wire 14B through a link mechanism 73. Accordingly, when the suction nozzle 11 moves (i.e., oscillates) in the right and left directions by being pulled or pushed through the wire 14B, the camera 71 can be swiveled and turned in the direction corresponding to the movement of the suction nozzle 11.

Incidentally, the swivel mechanism 72 may swivel the camera 71 according to the travel direction of the suction nozzle 11 by using a special wire, not shown, intended to drive the camera 71. In FIG. 14, reference numeral 74 denotes a camera cable.

According to this fifth embodiment, in addition to the advantageous effects (1) to (3) of the first embodiment, the following advantageous effect (10) may be provided.

(10) Since the camera 71 mounted on the low-center-of-gravity support member 13 is turned in the travel direction of the suction nozzle 11, the places to be cleaned by the suction nozzle 11 can be monitored by the camera 71. Thus, dust and the like accumulated on the reactor's inner bottom surface 3 can be thoroughly sucked and removed by using the suction nozzle 11.

It is further to be noted that the present invention is not limited to the embodiments described above, and many other changes, modifications and combinations may be made without departing from the scopes of the appended claims.

What is claimed is:

1. A cleaning apparatus comprising:
a suction unit provided with a suction source;
a suction nozzle equipped with a suction port adapted to suck dust from a surface to be cleaned;
a suction hose connected at one end to the suction nozzle and connected at another end to the suction unit;
a low-center-of-gravity support member provided for the suction hose so as to serve as a fulcrum when the suction hose is bent and deformed;
a wire member supported at a distal end by the suction nozzle and arranged along the suction hose and including a plurality of wires positioned around the suction hose spaced apart in the circumferential direction of the suction hose; and
a control unit configured to pull the wire member with the low-center-of-gravity support member serving as a fulcrum and manipulate the wire member to thereby deform the suction hose and then change a direction of the suction nozzle, the control unit formed on an opposite side of the low-center-of-gravity support member than the suction nozzle.

2. The cleaning apparatus according to claim 1, wherein the wire member is passed through a wire casing having a distal end supported by the low-center-of-gravity support member.

3. The cleaning apparatus according to claim 1, wherein the wire member is paired with a spring disposed to a position opposite to the wire member along the circumferential direction of the suction nozzle, and the spring is supported at one end by the suction nozzle and supported at another end by the low-center-of-gravity support member.

4. The cleaning apparatus according to claim 1, wherein the suction hose is provided with a wire guide which allows the wire member to pass therethrough, the wire guide being disposed between the suction nozzle and the low-center-of-gravity support member.

5. The cleaning apparatus according to claim 1, wherein the low-center-of-gravity support member is equipped with a wheel or ball caster.

6. The cleaning apparatus according to claim 1, further comprising an untwisting mechanism mounted on the suction hose inside or near the low-center-of-gravity support member, the untwisting mechanism being disposed to be opposite to the suction nozzle so as to correct twisting of the suction hose.

7. The cleaning apparatus according to claim 1, further comprising a flexible bend limiter fitted around the suction hose at a position between the suction nozzle and the low-center-of-gravity support member.

8. The cleaning apparatus according to claim 1, wherein the low-center-of-gravity support member is covered with a guide cover, the guide cover having a width of the guide cover set based on a width of a narrow and sloped surface to be cleaned.

9. The cleaning apparatus according to claim 1, further comprising an actuator installed at a portion in a vicinity of the low-center-of-gravity support member to pull or push the wire member.

10. The cleaning apparatus according to claim 1, further comprising: a rear low-center-of-gravity support member which is located farther from the suction nozzle than is the low-center-of-gravity support member and is heavier than the low-center-of-gravity support member; and an operating wire supported at a distal end thereof by the low-center-of-gravity support member, so that the low-center-of-gravity support member is moved by using the rear low-center-of-gravity support member as a fulcrum through manipulation of the operating wire.

11. The cleaning apparatus according to claim 1, wherein the low-center-of-gravity support member is mounted with a camera to be movable according to a travel direction of the suction nozzle.

12. The cleaning apparatus according to claim 1, wherein the surface to be cleaned is an inner bottom surface of a reactor pressure vessel, and the suction hose is fixed to an operating pole made up of a plurality of pole segments which are connected in sequence and lowered by a suspending member located above the reactor pressure vessel, and wherein an insertion rod is mounted on the suction hose at a portion between a fixing end of the operating pole and the low-center-of-gravity support member, the insertion rod being superior in elasticity and strength to the suction hose.

13. The cleaning apparatus according to claim 12, wherein the insertion rod is fixed at one end to the operating pole and fixed at another end to the low-center-of-gravity support member or to a portion of the suction hose disposed in a vicinity of the low-center-of-gravity support member.

14. The cleaning apparatus according to claim 12, wherein the low-center-of-gravity support member is connected to an operating rope extending above the reactor pressure vessel to be lifted upward.

* * * * *